United States Patent [19]
Wirth et al.

[11] Patent Number: 6,098,764
[45] Date of Patent: Aug. 8, 2000

[54] SHAFT BRAKE DISK FOR RAIL VEHICLE DISK BRAKE SYSTEMS AND METHOD OF MAKING SAME

[75] Inventors: Xaver Wirth, Ismaning; Robert Weiss, Karlsfeld; Mathias Schoerwerth, Geretsried, all of Germany

[73] Assignee: Knorr-Bremse Systeme für Scheinfahrzeuge GmbH, Munich, Germany

[21] Appl. No.: 09/035,343

[22] Filed: Mar. 5, 1998

[30] Foreign Application Priority Data

Mar. 5, 1997 [DE] Germany ............... 197 08 901

[51] Int. Cl.[7] ............... F16D 65/10; F16D 65/78
[52] U.S. Cl. ............... 188/218 XL; 188/264 A
[58] Field of Search ............... 188/218 XL, 264 A, 188/264 AA, 71.6

[56] References Cited

U.S. PATENT DOCUMENTS

| | | | |
|---|---|---|---|
| 4,564,242 | 1/1986 | Krude et al. | 188/264 A |
| 4,913,266 | 4/1990 | Russell et al. | 188/18 A |
| 5,190,124 | 3/1993 | Haneda | 188/218 XL |
| 5,224,572 | 7/1993 | Smolen, Jr. et al. | 188/218 XL |
| 5,407,032 | 4/1995 | Gaudefroy et al. | 188/58 |
| 5,526,914 | 6/1996 | Dwiveldi et al. | 188/218 XL |
| 5,540,305 | 7/1996 | Hammond et al. | 188/71.5 |

FOREIGN PATENT DOCUMENTS

| | | | |
|---|---|---|---|
| 123171 | 12/1976 | Germany . | |
| 2821-800 | 11/1979 | Germany | 188/218 XL |
| 140-577 | 3/1980 | Germany | 188/218 XL |
| 4400896C1 | 3/1995 | Germany . | |
| 296 03 468 U | 7/1996 | Germany . | |
| 406185550 | 7/1997 | Japan | 188/218 XL |

*Primary Examiner*—Robert Oberleitner
*Assistant Examiner*—Bradley King
*Attorney, Agent, or Firm*—Evenson, McKeown, Edwards & Lenahan, P.L.L.C.

[57] ABSTRACT

In a brake disk for rail vehicle brake systems, a friction ring is made of a light metal such as aluminum (aluminum alloys), etc. to reduce weight. In order to reduce the weight further by approximately an additional 10%, the hub that supports the friction ring and is connected with the shaft of the rail vehicle is also made of light metal, such as aluminum. It is necessary to keep the temperature of such hubs below 120–140° C. to prevent the shrink or press fit between the hub and shaft from loosening. To prevent such heat transmission, heat insulating layers are inserted between the inner circumference of the friction ring connected with the hub preferably by bolts. In the vicinity of the bolts, these layers can consist of insulating disks, insulating plates, or continuous insulating rings.

18 Claims, 2 Drawing Sheets

6,098,764

SHAFT BRAKE DISK FOR RAIL VEHICLE DISK BRAKE SYSTEMS AND METHOD OF MAKING SAME

BACKGROUND AND SUMMARY OF THE INVENTION

This application claims the priority of German application 197 08 901.1, filed Mar. 5, 1997 in Germany, the disclosure of which is expressly incorporated by reference herein.

The invention relates to a shaft brake disk for disk brake systems of rail vehicles, with a friction ring of light metal at its inner circumference connected by bolts with a hub flange projecting from the hub.

Brake disks for axles/disks of rail vehicles are either made in one piece (monobloc disks) or of individual parts, to improve their performance. Both traditional iron disks and light-metal friction rings, made of magnesium/aluminum for example, are connected with a steel hub such that the friction ring can expand preferably radially for example as it heats and at the same time transmits the braking torque. The hub itself is pressed or shrunk onto the axle or shaft (with heating) in the normal manner.

To reduce the weight of brake disks of the type in question, friction rings made of ceramic-reinforced aluminum have recently been developed and have achieved a weight reduction of approximately 40%.

A goal of the invention is to achieve a further weight reduction with shaft disk brakes of this type without impairing the quality of braking torque transmission. This goal is achieved according to preferred embodiments of the invention by providing a heat insulating layer between the hub flange and the friction ring.

By using hubs made of aluminum, a further weight reduction of another 10% is achievable, which is an important factor in brake disks operating at high speed. The problem of the relatively low strength of the light metal, of the low elasticity modulus, and the very high thermal expansion coefficients is solved according to the invention by providing a heat insulating layer between the inner circumference of the shaft brake disk and the supporting hub flange, said layer cutting heat transmission between the light-metal friction ring and the light-metal hub to the point that the critical temperature range of approximately 120–140° C. is not exceeded. Thus, transmission of braking torque between the hub and axle or shaft is not impaired. The heat insulating layer, in the vicinity of the bolts that serve for the bolted connection between the friction ring projections and the hub flange, comprises insulating elements traversed by the bolts, in the form of insulating disks or insulating plates. The insulating layer can also comprise an insulating ring that surrounds the bolts and has through bores for the bolts.

Advantageously, a clamping ring on the opposite side of the hub flange and made of light metal, in contrast to traditional designs can be made of aluminum, with a heat insulating layer being provided in this area also, between the clamping ring and the friction ring projections.

Other objects, advantages and novel features of the present invention will become apparent from the following detailed description of the invention when considered in conjunction with the accompanying drawings.

DETAILED DESCRIPTION OF THE DRAWINGS

Figure 1:
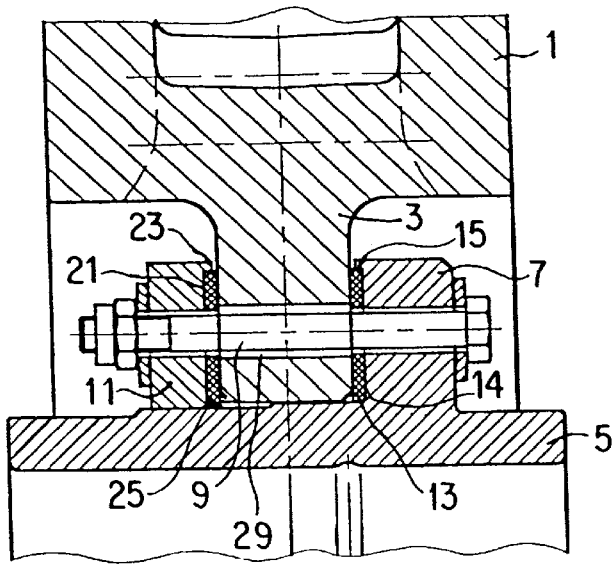
FIG. 1 is a partial sectional through a disk brake friction ring/hub connection using heat insulating layers provided on both sides of the friction ring projections at the hub flange or at the clamping ring, constructed according to a preferred embodiment of the present invention.

FIG. 1 of the drawing shows a brake disk known of itself in the form of a friction ring 1, said disk being connected with a hub 5 in the manner described below with the aid of friction ring projections located radially inward. The friction ring is made of aluminum, specifically ceramic-reinforced aluminum, which can achieve weight reductions of approximately 40% over steel friction rings or brake disks.

To achieve a further weight reduction, it is proposed according to the invention that hub 5 which is connected with the shaft of the rail vehicle, be made of aluminum as well. To deal with the problem of the relatively low strength of the light metal, the low elasticity modulus, and the very high thermal expansion coefficients (factor of 2 by comparison to steel), the material used for the hub is aluminum with a relatively high strength (heat-hardened) to achieve the necessary shrink pressure on the axle (not shown in the drawing). With a brake disk with a plane fit of the type in question there are large contact surfaces between the friction ring and the hub, so that low stresses arise in the connecting parts (flange of hub). The low elasticity modulus of the aluminum is offset by a considerable excess of the shrunk fit between the axle and the hub. Thus, a normal excess with steel hubs is 0.30 mm and for aluminum hubs, 0.50 mm.

Due to the good thermal conductivity of aluminum, the temperature of the friction ring upon braking is, because of the design, conducted fairly quickly into hub 5. The hub heats and expands, and does so more than a comparable hub made of steel by a factor of 2. Because of this, the press fit (taken for a cold shaft) between the aluminum hub and the steel shaft (not shown) will disappear at a temperature of only 120–140° C. This makes transmission of the braking torque impossible.

Figure 3:
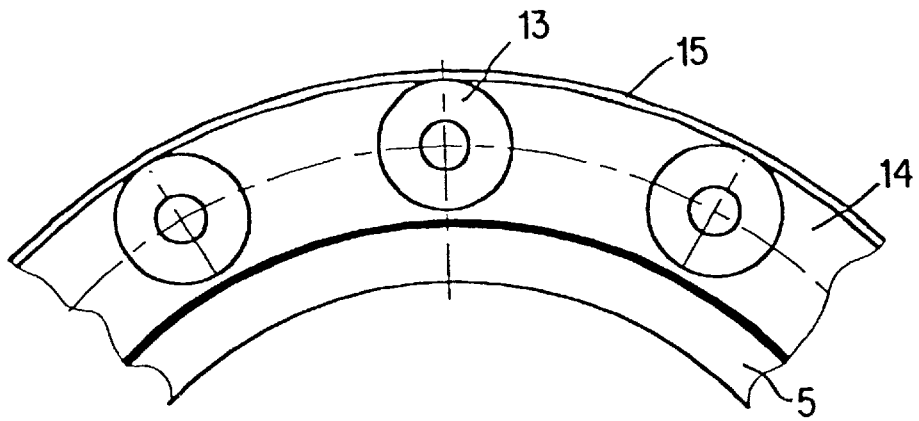
FIG. 3 is a partial top view along line III—III in FIG. 2, showing insulating disks, but without showing the friction ring.

To overcome these problems, a heat insulating layer is provided according to the invention between hub flange 7 and friction ring projections 3, explained as follows:

According to the section in FIG. 1 and the partial top view of FIG. 3 in the embodiment shown, the friction ring is bolted to hub 5 by a plurality of bolts 9 disposed in a partial circle, with bolts 9 passing through bores in the radially inward friction ring projections 3 of friction ring 1 and bores in hub flange 7 of hub 5 made of aluminum. A clamping ring 11 is provided as a counterpart to hub flange 7, said ring 11 being made of aluminum in the embodiment of FIG. 1 and abutting the left side of friction ring projection 3 in this figure and being clamped against this side. To avoid heat transmission between friction ring 1 made of aluminum and hub 5 also made of aluminum, insulating disks 13 are provided to form a heat insulating layer in the vicinity of bolts 9 between friction ring projections 3 of the friction ring and hub flange 7. In this way heat transmission between the friction ring projections and the hub flange is largely eliminated, i.e. hub 5 does not reach the critical temperatures at which the press fit or shrink fit on the shaft becomes loose. One such insulating disk per friction ring projection and bolt is provided. The insulating disks are preferably fitted into a groove 14 of the hub flange 7 and held radially externally by a shoulder 15. This prevents entrainment of insulating disks 13 by friction ring projections 3 moving under the influence of heat, namely lifting off the hub.

Figure 4:
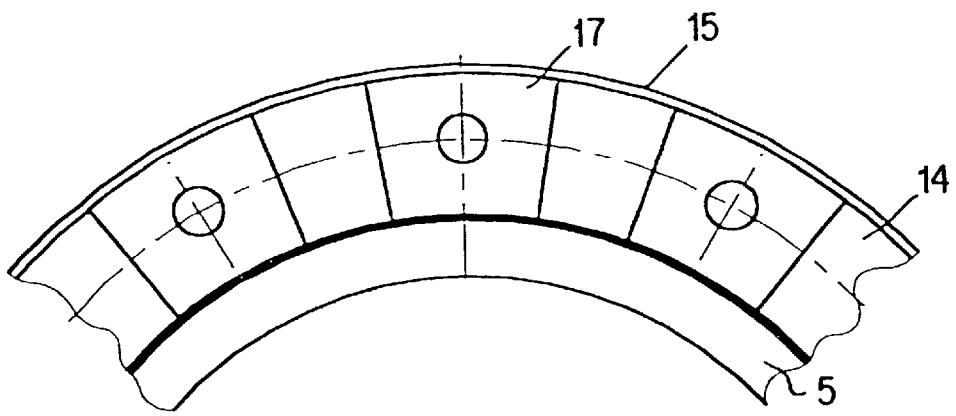
FIG. 4 is a view comparable to that of FIG. 3 showing a further embodiment of the heat insulating layer in the form of insulating plates.
Figure 5:
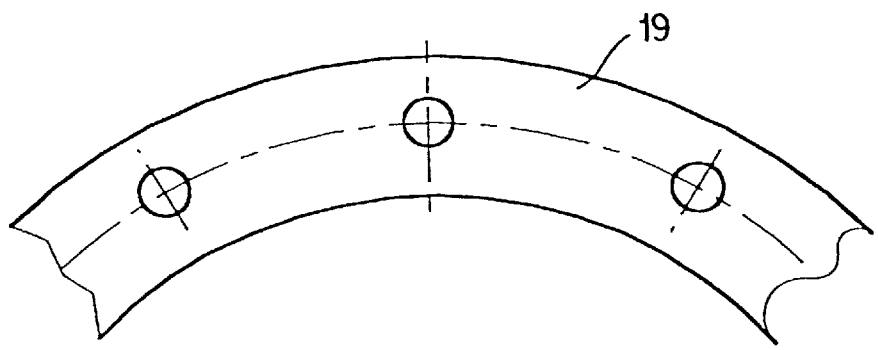
FIG. 5 is a view comparable to FIGS. 3 and 4 showing a further embodiment of the invention as an insulating ring.

FIGS. 4 and 5 show further embodiments of heat insulating layers. According to FIG. 4, insulating plates 17 are provided, which fit flush to the outer circumference of shoulder 15 and abut hub 5 internally.

FIG. 5 shows the design of the heat insulating layer as insulating ring 19, which is continuous and is held by a shoulder radially and externally in a manner comparable to the embodiments of FIGS. 3 and 4.

Since there would also be a problem of heat transmission between the friction ring, clamping ring, and hub, insulating disks 21 are provided between clamping ring 11 made of aluminum and the friction ring projections 3 of friction ring 1 in the vicinity of bolts 9. These insulating disks can have essentially the same design as insulating disks 13. In the same way, heat insulating layers of the embodiment shown in FIGS. 4 and 5 can be used. In the vicinity of clamping ring 11 as well, a groove 25 delimited on the outside by a shoulder 23 is provided, in which groove the insulating elements are mounted. Preferably the insulating layer is glued or sprayed with the thickness thereof being adjustable to individual circumstances. As far as the cylindrical fit of the friction ring projection opposite the hub is concerned (FIGS. 1 and 2), it does not have to be insulated, as a gap appears immediately upon heating of the friction ring, i.e. the friction ring expands radially outward. This gap provides good insulation.

Figure 2:
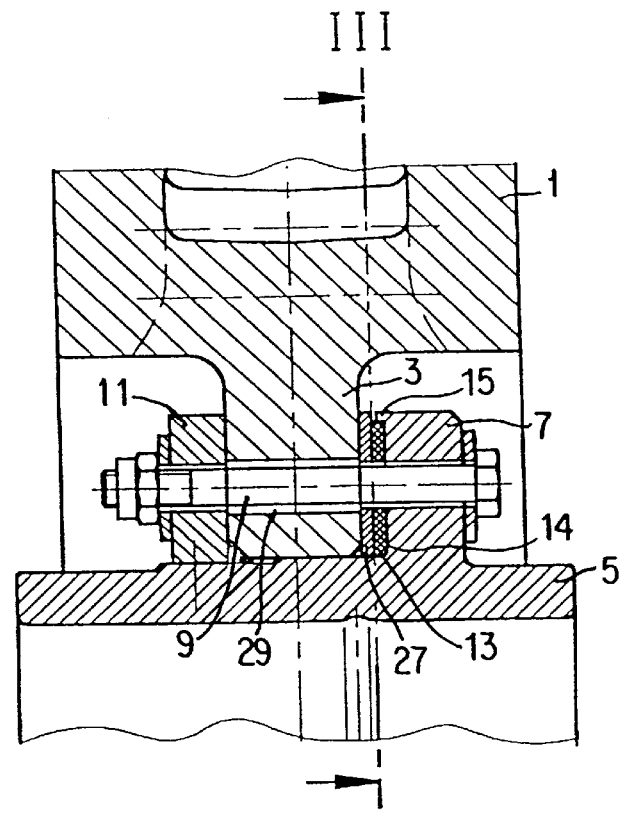
FIG. 2 is a sectional view comparable to that of FIG. 1 of a further embodiment of the invention, in which, in the vicinity of the friction ring projection/hub flange pair, a sheet-metal washer serving to improve the sliding behavior of the friction ring is inserted between the heat insulating layer and the friction ring projections.

The use according to the invention of hubs made of light metal, e.g. aluminum, to transmit the braking torque between the brake disk made of aluminum and the axle of the rail vehicle is not limited to the embodiment shown in FIG. 1. In FIG. 2, another embodiment is shown in which the heat insulating layer between the friction ring and the friction ring projection is dispensed with in the vicinity of clamping ring 11, since the clamping ring, consisting of steel, has far lower thermal conductivity than aluminum for example. In the vicinity of the connection shown on the right-hand side, between the heat insulating layer in the form of the insulating disks, insulating plates, etc. and the friction ring projection 3, a sheet-metal ring 27 is provided. Such a sheet-metal ring, made of steel for example, has outstanding sliding properties relative to the friction ring projections. This ensures that when the friction ring projection moves radially outward (when the friction ring heats up), the heat insulating layer is not rubbed or otherwise damaged. When the friction ring heats up, the clamping ring and sheet-metal ring remain in their positions shown in the drawing and the friction ring projections, because of the through bore 29 in the friction ring projections, execute radial movements with respect to the clamping ring and sheet-metal ring. If instead of clamping ring 11 in the arrangement shown in FIG. 2, a clamping ring made of aluminum is used, an insulating layer and additionally a sheet-metal ring can be provided in this case too, namely a mirror-image arrangement for pairing on the right side.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Shaft brake disk for disk brake systems of rail vehicles, with a friction ring consisting of light metal, said friction ring being connected at its inner circumference by bolts with a hub flange projecting from a hub, wherein a heat insulating layer is provided between the hub flange and the friction ring, wherein the inner circumference of the friction ring is formed of friction ring projections, said projections being tensioned by through bolts with the hub flange and, on the opposite side, with a clamping ring, wherein the heat insulating layer consists of an insulating ring or of individual insulating elements, said elements being disposed between the friction ring projections and the hub flange, wherein the clamping ring also is made of a light metal, wherein a further heat insulating layer is provided on the inside of the clamping ring facing the friction ring projections and, wherein a sheet-metal ring is provided between the friction ring projections and the heat insulating layer, said sheet metal ring having good sliding properties relative to the friction ring projections and being also traversed by the bolts.

2. Shaft brake disk according to claim 1, wherein a circumferential groove is formed at the inside of the clamping ring that faces the friction ring projections, in which groove the heat insulating layer is provided in the form of insulating disks, insulating plates, or in the form of an insulating ring.

3. Shaft brake disk according to claim 1, wherein the further insulating layer is glued or sprayed on the clamping ring.

4. Shaft brake disk for disk brake systems of rail vehicles, with a friction ring consisting of light metal, said friction ring being connected at its inner circumference by bolts with a hub flange projecting from a hub, wherein a heat insulating layer is provided between the hub flange and the friction ring, and wherein a sheet-metal ring is provided between friction ring projections of the friction ring and the heat insulating layer, said sheet metal ring having good sliding properties relative to the friction ring projections and being also traversed by the bolts.

5. Shaft brake disk according to claim 4, wherein a clamping ring made of steel is disposed on an axial side of the friction ring projections opposite the heat insulating layer, and wherein there is no heat insulating layer between the clamping ring and the friction ring projections.

6. A process of making a shaft brake disk for disk brake systems of rail vehicles, comprising:

providing a friction ring of light metal, connecting the friction ring at its inner circumference by bolts to a hub flange projecting from a hub made of light metal, inserting a heat insulating layer between the hub flange and the friction ring, and inserting a sheet metal member between the heat insulating layer and the friction ring, said sheet metal member having good sliding properties relative to the friction ring.

7. A process according to claim 6, wherein the inner circumference of the friction ring is formed of friction ring projections, said projections being tensioned by through bolts with the hub flange and, on the opposite side, with a clamping ring, and wherein the heat insulating layer consists of an insulating ring or of individual insulating elements, said elements being disposed between the friction ring projections and the hub flange.

8. A shaft brake disk assembly comprising:

a hub flange projecting radially from a hub, a friction ring formed of light metal and having respective first and second surfaces facing in respective opposite axial directions, and at least one connecting member extending through respective axially extending openings in the hub flange and friction ring and operable to clampingly connect the hub flange and friction ring together, wherein at least one heat insulating member is interposed between the hub flange and the first surface of the friction ring, and wherein a sheet metal member is interposed between the heat insulating member and the first surface of the friction ring.

9. A shaft brake disk assembly according to claim 8, wherein the at least one connecting member includes a plurality of connecting members formed as clamping bolts, and wherein the at least one heat insulating member includes separate heat insulating members surrounding each of the respective clamping bolts.

10. A shaft brake disk assembly according to claim 8 wherein the at least one connecting member includes a plurality of connecting members formed as clamping bolts, and wherein the at least one heat insulating member is an insulating ring member which is penetrated by the clamping bolts.

11. A shaft brake disk assembly according to claim 8, wherein the friction ring includes a plurality of radially inwardly projecting friction ring projections which each exhibit the respective first and second surfaces, and wherein the at least one connecting member includes a plurality of connecting members formed as clamping bolts which extend through respective ones of the friction ring projections.

12. A shaft brake disk assembly according to claim 8 wherein a clamping ring is disposed to clamp against the second surface of the friction ring, wherein the clamping ring is made of light metal, and wherein at least one further heat insulating member is disposed between the clamping ring and the second surface of the friction ring.

13. A shaft brake disk assembly according to claim 9, wherein a clamping ring is disposed to clamp against the second surface of the friction ring, wherein the clamping ring is made of light metal, and wherein at least one further heat insulating member is disposed between the clamping ring and the second surface of the friction ring.

14. A shaft brake disk assembly according to claim 10, wherein a clamping ring is disposed to clamp against the second surface of the friction ring, wherein the clamping ring is made of light metal, and wherein at least one further heat insulating member is disposed between the clamping ring and the second surface of the friction ring.

15. A shaft brake disk assembly according to claim 11, wherein a clamping ring is disposed to clamp against the second surface of the friction ring, wherein the clamping ring is made of light metal, and wherein at least one further heat insulating member is disposed between the clamping ring and the second surface of the friction ring.

16. A shaft brake disk assembly according to claim 8, wherein the friction ring is formed of aluminum.

17. A shaft brake disk assembly according to claim 8, wherein the friction ring is formed of ceramic reinforced aluminum.

18. Shaft brake disk according to claim 1, wherein the insulating ring or the insulating elements are inserted facing the friction ring projections in a circumferential groove of the hub flange and are traversed by bolts of the bolt connection.

\* \* \* \* \*